United States Patent [19]

Kweon et al.

[11] Patent Number: 5,762,900
[45] Date of Patent: Jun. 9, 1998

[54] CARBON-DOPED LITHIUM MANGANESE OXIDE AND MANUFACTURING METHOD THEREFOR USING POLYETHYLENE GLYCOL

[75] Inventors: Ho-jin Kweon; Hyu-bum Park, both of Suwon; Keon Kim, Seoul, all of Rep. of Korea

[73] Assignee: Samsung Electronics Co., Ltd., Kyungki-do, Rep. of Korea

[21] Appl. No.: 667,015

[22] Filed: Jun. 20, 1996

[30] Foreign Application Priority Data

Jan. 19, 1996 [KR] Rep. of Korea ............ 1996-1106

[51] Int. Cl.$^6$ ............................................. C01G 45/12
[52] U.S. Cl. .................................. 423/599; 252/518
[58] Field of Search .................... 423/599, 415.1; 429/224; 252/518

[56] References Cited

U.S. PATENT DOCUMENTS

| | | | |
|---|---|---|---|
| 3,846,527 | 11/1974 | Winter et al. | 423/592 |
| 4,812,426 | 3/1989 | Takagi et al. | 423/599 |
| 5,478,672 | 12/1995 | Mitate | 429/224 |
| 5,561,006 | 10/1996 | Lecerf et al. | 423/599 |
| 5,601,796 | 2/1997 | Frech et al. | 423/599 |

FOREIGN PATENT DOCUMENTS

| | | | |
|---|---|---|---|
| 2276155 | 9/1994 | United Kingdom | 423/599 |
| 9421560 | 9/1994 | WIPO | 423/599 |

*Primary Examiner*—Steven Bos
*Attorney, Agent, or Firm*—Burns, Doane, Swecker & Mathis, LLP

[57] ABSTRACT

Carbon-doped lithium manganese oxides in crystalline powder form can be used as electrode material. The carbon-doped lithium manganese oxide is prepared by a process including the steps of:

preparing a first solution of a lithium compound and a manganese compound, said first solution having lithium ions and manganese ions at a mole ratio of 1:2;

preparing a solution of polyethylene glycol and adding the polyethylene glycol solution to said first solution to form a second solution and then drying the second solution until a gel is obtained while stirring the second solution; and pre-treating said gel and then heating the pre-treated gel.

7 Claims, 1 Drawing Sheet

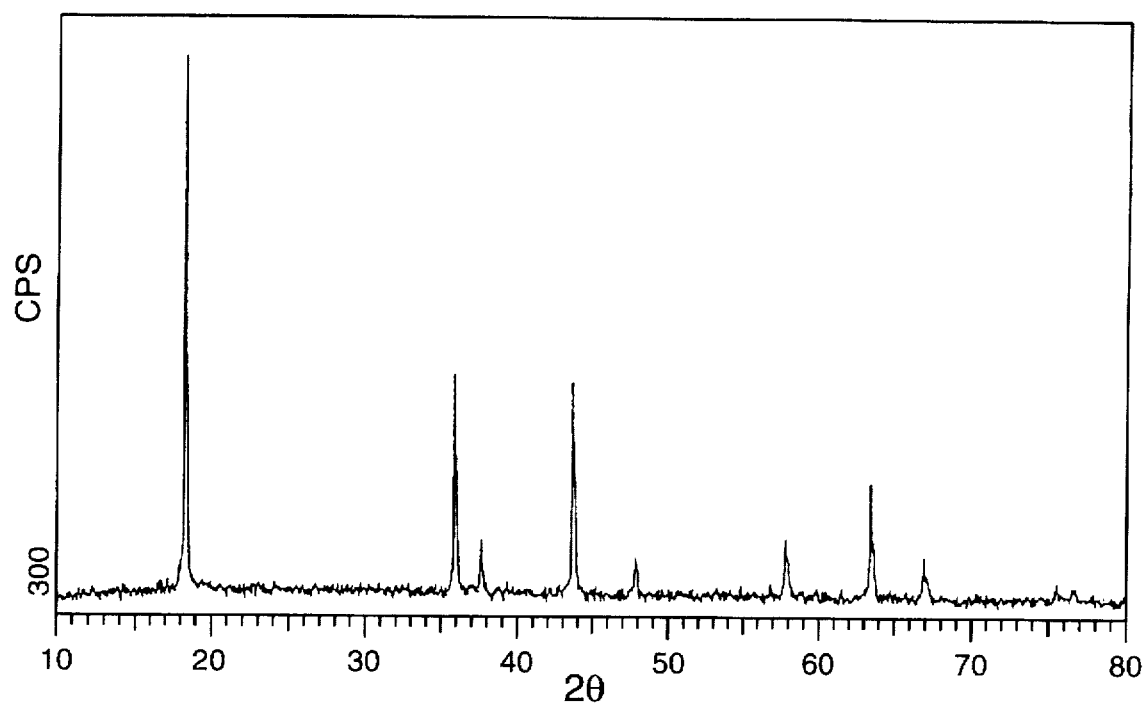
FIG._1
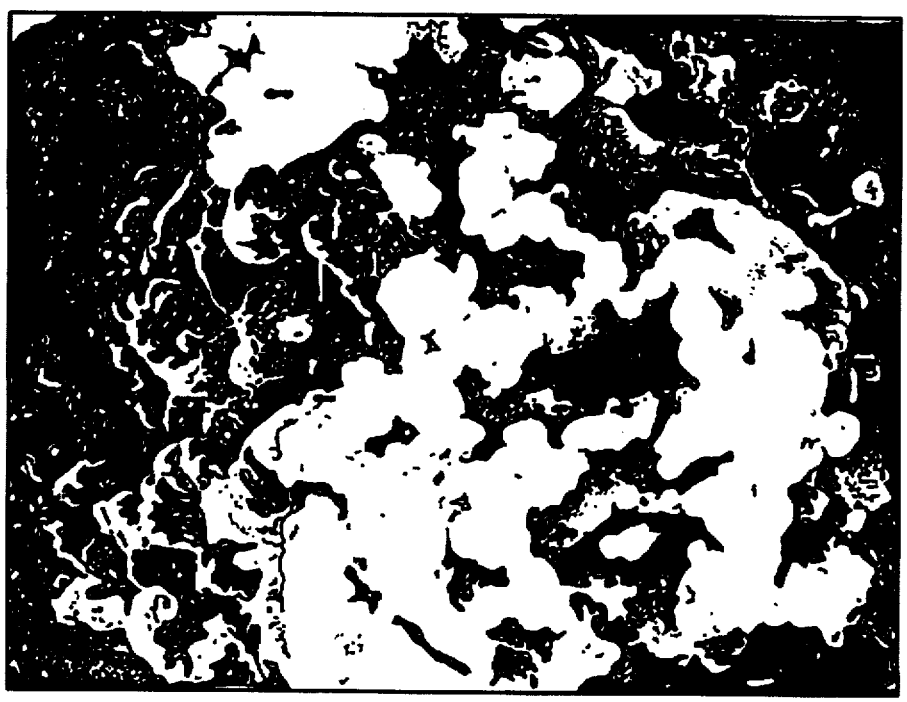
FIG._2

CARBON-DOPED LITHIUM MANGANESE OXIDE AND MANUFACTURING METHOD THEREFOR USING POLYETHYLENE GLYCOL

BACKGROUND OF THE INVENTION

The present invention relates to carbon-doped lithium manganese oxides and methods for manufacturing the same, and more particularly, to a carbon-doped lithium manganese oxide in powdered form which exhibits excellent conductivity.

Generally, while composite metal oxides are thermally stable, they are non-conductive or semiconductive. Thus, composite metal oxides are not suitable for use as electrode material. As a result, there has been research to find a method of forming composite metal oxides having high conductivity and high thermal stability that are suitable for use as electrode material.

In order to increase the conductivity of composite metal oxides, these materials have been physically mixed with a conductor such as carbon black. However, the improvement in conductivity is often poor since the materials are not uniformly mixed.

In addition, it is desirable when employing composite metal oxide as an electrode material that the composite metal oxides have large surface areas and exhibit uniform particle size. However, current commercial composite metal oxides are formed from various salts including metal components by a calcination process that takes place at above 1,000° C. This process produces particles that have small surface areas and a nonuniform size distribution. As a result, physical contact between current composite metal oxides and another substance is not good. Therefore, the composite metal oxide is not suitable for use as electrode material in high efficient batteries.

SUMMARY OF THE INVENTION

It is an object of the present invention to provide an electrode material having excellent electrical conductivity, and which can be used without the inclusion of conductive materials, such as carbon black.

It is another object of the present invention to provide a method for manufacturing electrode material particles having excellent electrical conductivity and large surface areas.

The electrode material comprises a carbon-doped lithium manganese oxide in crystalline powder form.

The method for manufacturing a carbon-doped lithium manganese oxide includes the steps of:

preparing a mixture comprising a lithium compound and a manganese compound, including lithium ions and manganese ions at a mole ratio of 1:2;

adding a polyethyleneglycol solution to said mixture and drying the mixture until a gel is obtained while stirring the mixture; and pre-treating said gel and then heating the pre-treated gel.

Preferably, the lithium compound includes lithium acetate or lithium nitrate and the manganese compound includes manganese acetate or manganese nitrate.

Also, the pre-treating step and the heating step are preferably performed at 200° to 300° C. and 400° to 800° C., respectively.

BRIEF DESCRIPTION OF THE DRAWINGS

The above objects and advantages of the present invention will become more apparent by describing in detail preferred embodiments thereof with reference to the attached drawings in which;

FIG. 1 is a diagram showing the result of X-ray diffraction analysis with respect to a carbon-doped lithium manganese oxide manufactured according to a preferred embodiment of the present invention; and FIG. 2 is a scanning electron microscope picture of a carbon-doped lithium manganese oxide manufactured according to a preferred embodiment of the present invention.

DETAILED DESCRIPTION OF THE INVENTION

According to the present invention, polyethyleneglycol (PEG) is used to manufacture a metal oxide in fine powder form to yield a large surface area. The use of PEG is preferred because it mixes with each metal ion at a molecular level and is very soluble in water which is a common solvent used for dissolving a metal salt.

According to the present invention, PEG having the above characteristics is added to a solution containing lithium and manganese ions to obtain a sol in which the metal ions are mixed at the molecular level. Next, the sol is dried to obtain a gel before the gel is subject a thermal process to yield a finely powdered composite metal oxide having a large surface area. The composite metal oxide is suitable for manufacturing electrodes for various fuel cells.

In addition, the metal oxide is doped with carbon by the thermal process which occurs at between 400° to 800° C. In contrast, according to conventional methods, the thermal process is performed at above 1,000° C. whereby carbon is easily removed. As a result, conventional methods produce composite metal oxides with low conductivity. The thermal process of the present invention is performed at a relatively lower temperature, so that the metal oxide can be doped with carbon.

Hereinafter, a method of manufacturing a finely powdered carbon-doped lithium manganese oxide according to the present invention will be described in detail.

First, soluble lithium and manganese compounds such as their acetate salts or nitrate salts are dissolved in water in a predetermined molar ratio to obtain a solution containing metal ions. A predetermined amount of PEG is completely dissolved in water and the PEG solution is then added to the solution containing the metal ions. This final solution is stirred until a sol of PEG-metal salt is obtained.

In the present invention, the amount of PEG added is measured in terms of the molar ratio of the repeating unit of the polymer to metal ion included in the metal salt (U.N./metal ion). Preferably, the molar ratio of the added PEG is 1 to 10. When the molar ratio of the PEG is less than 1, the surface area and the carbon-doping effect are inadequate. On the other hand, when the molar ratio of the PEG is above 10, it is difficult to generate crystalline structures.

After the sol of PEG-metal salt is obtained, the sol is stirred at 60° to 80° C. for 18 to 24 hours to remove the water. As the water evaporates, the sol changes into a highly viscous gel having an orange color.

Subsequently, the PEG-metal salt gel is first pre-heated to 200° to 300° C. before a substantial thermal process is performed to obtain the lithium-manganese oxide as a fine powder. Preferably, the thermal process is performed in an electric furnace at 400° to 800° C.

Hereinafter, the present invention will be described with reference to a preferred embodiment. However, this invention is not limited to the particular forms to be illustrated.

Embodiment

A solution containing Li (NO$_3$) and Mn (NO$_3$) .9H$_2$O at a 1:2 mole ratio was prepared. Separately, PEG having a weight average molecular weight of 20,000 was dissolved in water. Then, the PEG solution was added to the first solution which is then stirred to obtain a sol of PEG-metal salt with a concentration of 3 U.N./metal ion. This sol was stirred at 70° C. for 20 hours to obtain a gel of PEG-metal salt. Subsequently, the gel of PEG-metal salt was pre-heated to 300° C. for 1 hour in air, to yield carbon-doped lithium manganese oxide powder.

A crystalline structure of the carbon-doped lithium manganese oxide powder was observed by X-ray diffraction analysis which was performed in the range of 10° to 80° at a speed of 4°/min. The result of this analysis is shown in FIG. 1.

As shown in FIG. 1, a single crystalline structure is formed at 600° C., which is comparatively low, in such a short period of time. This is because the metal ions are uniformly distributed by the PEG.

Subsequently, FIG. 2 is an electron scanning microscope picture of the carbon-doped lithium manganese oxide manufactured according to the above embodiment. As shown in FIG. 2, the lithium manganese oxide manufactured according to the present invention is a fine powder, where the particle size of the powder is uniform and the average diameter is below 1 μm. This is due to the fact that metal ions are uniformly distributed by the polymer.

As described above, the carbon-doped lithium manganese oxide of the present invention is finely powdered, providing excellent conductivity. Therefore, the carbon-doped lithium manganese oxide can be used as an electrode material of a lithium secondary battery without using any other conductive materials.

What is claimed is:

1. A method for manufacturing a carbon-doped lithium manganese oxide, comprising the steps of:

preparing a first solution of a lithium compound and a manganese compound, said first solution having lithium ions and manganese ions at a mole ratio of 1:2;

preparing a solution of polyethylene glycol and adding the polyethylene glycol solution to said first solution to form a second solution and then drying the second solution until a gel is obtained while stirring the second solution; and pre-treating said gel and then heating the pre-treated gel to form carbon-doped lithium manganese oxide.

2. A method for manufacturing a carbon-doped lithium manganese oxide as claimed in claim 1, wherein said lithium compound is one selected from the group consisting of lithium nitrate and lithium acetate.

3. A method for manufacturing a carbon-doped lithium manganese oxide as claimed in claim 1, wherein said manganese compound is one selected from the group consisting of manganese nitrate and manganese acetate.

4. A method for manufacturing a carbon-doped lithium manganese oxide as claimed in claim 1, wherein the amount of polyethylene glycol solution added to said first solution is such that the mole ratio of the repeating unit of the polymer to total lithium and manganese ions in the second solution is 1 to 10.

5. A method for manufacturing a carbon-doped lithium manganese oxide as claimed in claim 1, wherein said drying step is performed at 60° to 80° C. for 18 to 24 hours.

6. A method for manufacturing a carbon-doped lithium manganese oxide as claimed in claim 1, wherein said pre-treating step is performed at 200° to 300° C.

7. A method for manufacturing a carbon-doped lithium manganese oxide as claimed in claim 1, wherein said heating step is performed at 400° to 800° C.

* * * * *